US012641032B1

(12) United States Patent
Cohn et al.

(10) Patent No.: US 12,641,032 B1
(45) Date of Patent: May 26, 2026

(54) SYSTEM FOR LATENCY NORMALIZATION

(71) Applicant: AMAZON TECHNOLOGIES, INC., Seattle, WA (US)

(72) Inventors: Daniel Todd Cohn, Bainbridge Island, WA (US); Mitchell Bernard Skiba, Mountain View, CA (US); Timothy Dennis Crain, Seattle, WA (US); Dandan Wang, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 68 days.

(21) Appl. No.: 18/900,195

(22) Filed: Sep. 27, 2024

Related U.S. Application Data

(60) Provisional application No. 63/586,542, filed on Sep. 29, 2023.

(51) Int. Cl.
| | |
|---|---|
| *H04L 47/34* | (2022.01) |
| *H04L 47/27* | (2022.01) |
| *H04L 49/90* | (2022.01) |
| *H04L 67/12* | (2022.01) |

(52) U.S. Cl.
CPC ............. *H04L 47/34* (2013.01); *H04L 47/27* (2013.01); *H04L 49/90* (2013.01); *H04L 67/12* (2013.01)

(58) Field of Classification Search
CPC ......... H04L 47/34; H04L 47/27; H04L 49/90; H04L 67/12
USPC ........................................................ 709/238
See application file for complete search history.

(56) References Cited

U.S. PATENT DOCUMENTS

| | | | | |
|---|---|---|---|---|
| 11,316,582 | B1 * | 4/2022 | Rashid | ............... H04B 7/18528 |
| 2011/0002311 | A1 * | 1/2011 | Wang | ....................... H04L 47/34 |
| | | | | 370/336 |
| 2020/0187282 | A1 * | 6/2020 | Yu | ......................... H04L 5/0055 |

OTHER PUBLICATIONS

"Circular buffer", Wikipedia, 6 pages. Retrieved from the Internet: URL: https://en.wikipedia.org/wiki/Circular_buffer.
"Normalization", OPNsense, Firewall, 1 pg. Retrieved from the Internet: URL: https://docs.opnsense.org/manual/firewall_scrub.html.
Sokolov, et al., "Inter-packet delays normalization to limit IP covert timing channels", National Research Nuclear University MEPhI, Feb. 23, 2020, 7 pgs. Retrieved from the Internet: URL: https://pdf.sciencedirectassets.com/280203/1-s2.0-S1877050920X00068/1-s2.0-S1877050920303604/main.pdf?X-Amz-Security-Token=IQoJb3JpZ2luX2VjEGsaCXVzLWVhc3QtMSJIMEYCIQCgS99u5P64eLojn4IDI17LMCtc6OqzH7Y2CHupyEcK%2FwlhAIW%2BrYitPtFqe1HrFGXepZjhmRQsn%2BhSw6zdEFCtEyU9KrsFCJT%2F%2F%2F%2F%2F%2F%2F%2F.

* cited by examiner

*Primary Examiner* — Zi Ye
(74) *Attorney, Agent, or Firm* — Lindauer Law, PLLC

(57) ABSTRACT

Variations in latency, out-of-order, and duplication may occur for incoming packets delivered via a network including a constellation of low-Earth orbit (LEO) satellites. An incoming packet that comprises time data and a sequence number is received at a user terminal. A delivery deadline time (deadline) is determined for the incoming packet. The incoming packet and its deadline are stored in a waiting buffer. Packets from the waiting buffer are processed for storage into "slots" that correspond to sequence numbers of the incoming packets. A window designates which portion of the slots may be written to or read from. The window may comprise a circular buffer. The window may be "moved" relative to the slots based on sequence number of an incoming packet, highest packet transmitted, maximum permitted movement, lowest window stop, highest window stop, and (Continued)

so forth. Packets in slots within the window that have reached their deadline are sent.

20 Claims, 10 Drawing Sheets

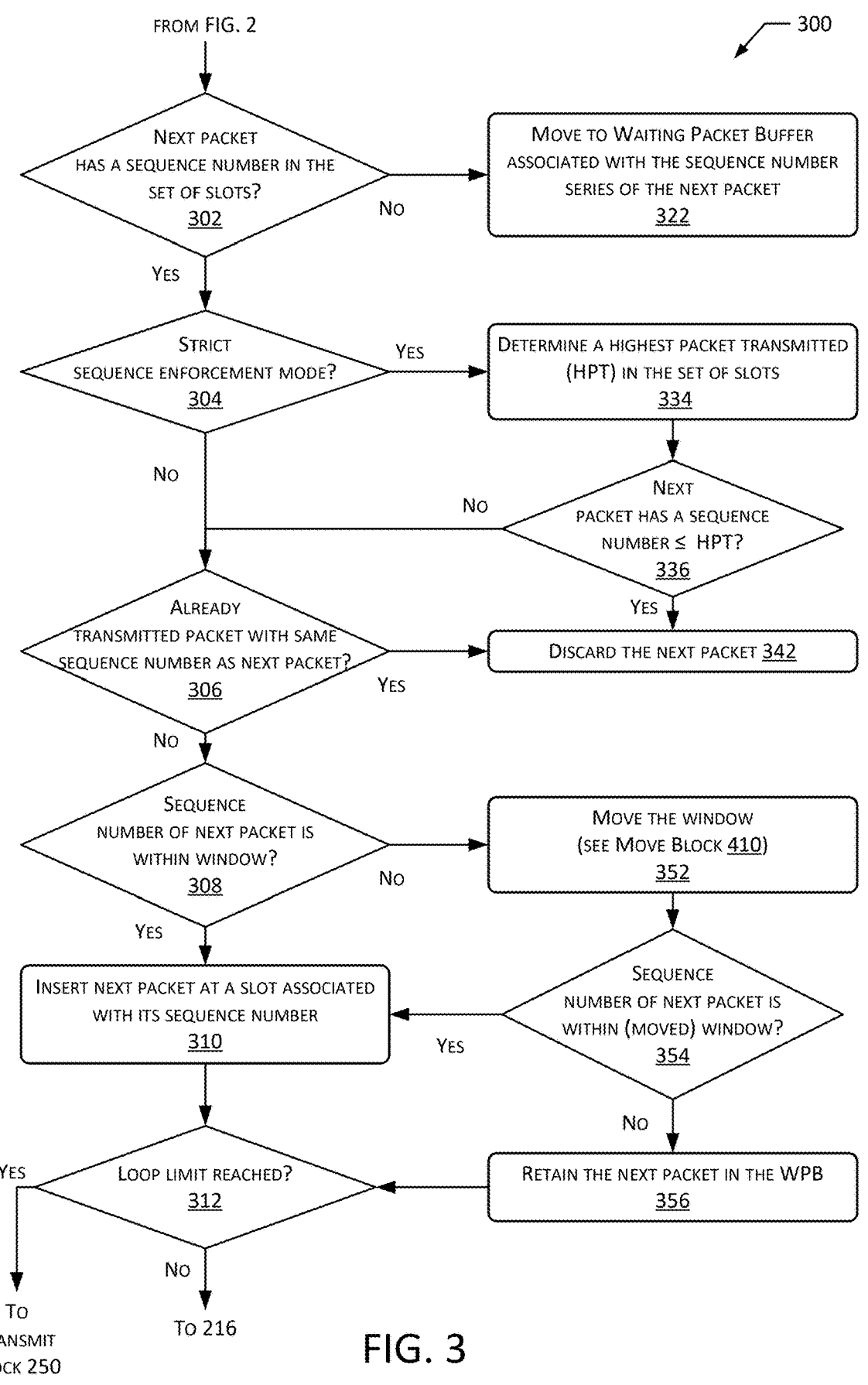

FROM FIG. 2

300

NEXT PACKET HAS A SEQUENCE NUMBER IN THE SET OF SLOTS?
302

No → MOVE TO WAITING PACKET BUFFER ASSOCIATED WITH THE SEQUENCE NUMBER SERIES OF THE NEXT PACKET
322

YES

STRICT SEQUENCE ENFORCEMENT MODE?
304

YES → DETERMINE A HIGHEST PACKET TRANSMITTED (HPT) IN THE SET OF SLOTS
334

No

NEXT PACKET HAS A SEQUENCE NUMBER ≤ HPT?
336

No →

YES

ALREADY TRANSMITTED PACKET WITH SAME SEQUENCE NUMBER AS NEXT PACKET?
306

YES → DISCARD THE NEXT PACKET 342

No

SEQUENCE NUMBER OF NEXT PACKET IS WITHIN WINDOW?
308

No → MOVE THE WINDOW (SEE MOVE BLOCK 410)
352

YES

INSERT NEXT PACKET AT A SLOT ASSOCIATED WITH ITS SEQUENCE NUMBER
310

SEQUENCE NUMBER OF NEXT PACKET IS WITHIN (MOVED) WINDOW?
354

YES ←

No

LOOP LIMIT REACHED?
312

YES

RETAIN THE NEXT PACKET IN THE WPB
356

No

TO TRANSMIT BLOCK 250

SYSTEM FOR LATENCY NORMALIZATION

PRIORITY

This application claims priority to, and the benefit of, U.S. Provisional Patent Application Ser. No. 63/586,542 filed on Sep. 29, 2023, titled "SYSTEM FOR LATENCY NORMALIZATION", the contents of which are hereby incorporated by reference into the present disclosure.

BACKGROUND

Wireless transmission of data provides many benefits. Satellites and other devices may wirelessly transfer data between different locations.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIGS. 2, 3, and 4 are flow diagrams of a process of normalizing latency of incoming packets using slots and a window, according to some implementations.

Figure 1:
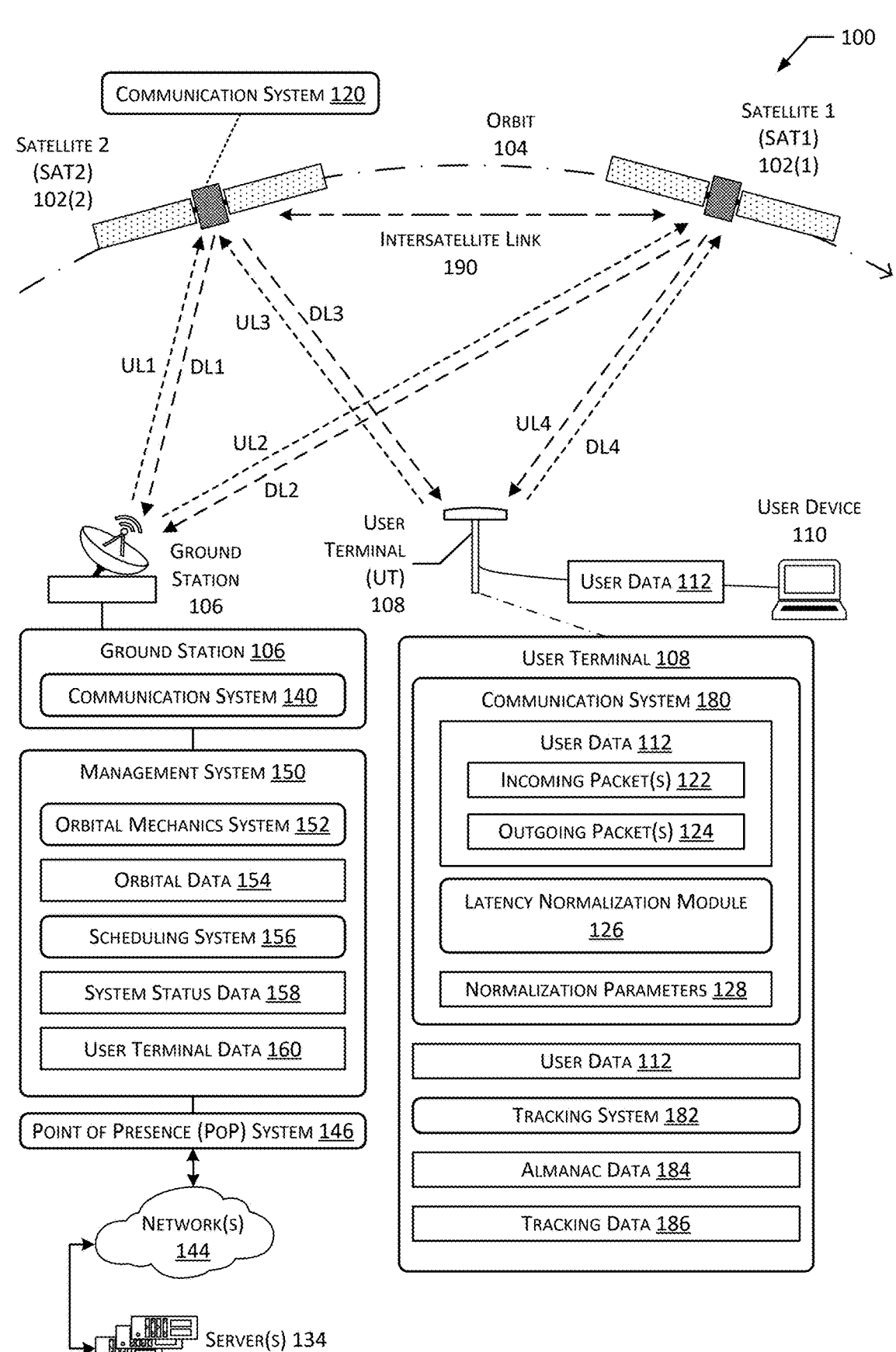
FIG. 1 illustrates a system using ground stations, a constellation of satellites, and user terminals with latency normalization, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

The ability to transmit data wirelessly provides tremendous utility. Wireless transmission uses one or more frequencies of electromagnetic signals, such as radio frequency (RF) signals, to send information.

A constellation of communication satellites may be used to provide communication services between ground stations and devices, such as user terminals (UT) located on or near a body such as the Earth. For example, incoming packets of data from the internet may be sent to a point-of-presence (POP) that is then sent to a ground station, which is then sent to a first satellite which in turn sends the incoming packets to a UT.

For ease of illustration, and not necessarily as a limitation, a satellite may be deemed "in range" of a station such as a ground station or UT when communication may take place with that station. For example, a satellite may be in range when it is within line of sight of the ground station, a distance between the satellite and the ground station is less than a threshold distance, the ground station is within a footprint of an antenna onboard the satellite, and so forth. One of the factors that determines how long a satellite is within range of the station is an orbital period of the satellite that is determined by the altitude of the satellite.

The period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite may be in range of a particular station for only a few minutes. This results in frequent handovers from one satellite to another to maintain continuous communication services. In comparison, a geosynchronous satellite has an orbital period that coincides with the rotation of the Earth, so a geosynchronous satellite appears to remain motionless with respect to the Earth. While the apparent motionlessness with respect to the station removes the need for handoffs, other drawbacks associated with the geosynchronous satellite remain.

Signals between the station and the satellite are limited to travelling at the speed of light. The farther away a satellite is from the station, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving a non-geosynchronous orbit (NGO) satellite at an altitude of 600 km only introduces about 4 ms of latency comprising 2 ms up to the satellite and 2 ms down to the station. However, the latency varies as distance between the NGO satellite and the UT and the ground station changes. As a result, compared to using geosynchronous satellites, the use of NGO satellites significantly reduces latencies due to signal travel times, but latencies vary significantly during the course of communication.

The latency of incoming packets can be further affected due to changes in routing. For example, incoming packets may follow different routes before reaching the PoP. In another example, incoming packets may follow different routes between the POP and the ground station.

Latency may also be affected by the communication between the UT and the satellite. For example, the satellite and the UT may communicate using half duplex communication, with the UT alternately transitioning between transmit and receive. This introduces a delay as incoming packets are not received while the satellite is transmitting and the UT is receiving.

Incoming packets may also be subject to other factors affecting delivery. Some incoming packets may be delivered to the UT out-of-order (OOO). For example, a first packet may be delayed while a later-transmitted second packet may arrive at the UT before ethe first packet. Some incoming packets may be duplicated during transmission. For example, the PoP may send a first packet to a first ground station and a copy of the first packet to a second ground station to avoid packet loss during a handover.

Described in this disclosure is a system and techniques for latency normalization of incoming (received) packets. The system stabilizes the overall latency of incoming packets by selectively sending the incoming packets to a destination device based on a deadline and their presence within a window. The system is also able to accommodate OOO incoming packets, and deduplicate incoming packets before sending.

The deadline is based on a transmission time of the incoming packet and may take into account various factors. These factors may include expected latency due to the changing distance to the satellite, half-duplex operation, routing that involves use of an intersatellite link, and so forth. For example, the deadline may be calculated as a sum of the transmission time and a peak expected latency.

During operation, incoming packets are held in a first-in-first-out (FIFO) waiting packet buffer (WPB). Associated with each incoming packet is a sequence number and a deadline. Packets from the waiting buffer are processed for placement into "slots" that correspond to sequence numbers of the incoming packets. A window designates which portion of the slots may be written to or read from. In some implementations the window may comprise a circular buffer. During operation, the window is moved relative to the slots. The movement of the window may be based on sequence number of an incoming packet, highest packet sequence number previously transmitted, maximum permitted movement of the window, lowest window stop, highest window stop, and so forth. The lowest window stop and the highest window stop constrain movement of the window forward or backward, respectively. Incoming packets stored in slots that are within the window that have reached their deadline are sent. The use of the window allows for handling of OOO packets, and in some situations, mitigation. The use of the window also allows for deduplication before sending the incoming packets to a destination device. For example, late arriving OOO incoming packets may be inserted into their respective slots and subsequently are transmitted in order, or may be sent OOO. In another example, incoming packets having sequence numbers that have already been received and stored in a slot are discarded.

By utilizing the system and techniques described herein, incoming packets are delivered to a destination device(s) with a more regular cadence, avoiding substantial changes in latency between packets. Substantial changes in latency between incoming packets may adversely affect application operation, operation of network protocols, and so forth. For example, substantial changes in latency may adversely affect operation of voice over internet protocol (VOIP) applications. The OOO mitigation and deduplication before delivery to the destination device may also improve overall operation of the application, network protocols, and so forth at the destination device.

The system and techniques may be used in a variety of applications including, but not limited to intersatellite communications, communications between satellite and ground station, communications between satellite and user terminals, between vehicles, between terrestrial stations, and so forth.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, personal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight".

As height above ground increases, the area on the ground that is visible from that elevated point increases. For example, the higher you go in a building or on a mountain, the farther you can see. The same is true for the electromagnetic signals used to provide communication service. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because of the period that the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes with the distance between the observer and the satellite constantly changing.

Geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication service also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. While it may still be necessary to focus the signals using parabolic antennas or phase array antennas, the reduced distance may reduce the needed gain. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S), each satellite 102 being in orbit 104. Also shown is a ground station 106, user terminal (UTs) 108, and a user device 110.

The constellation may comprise hundreds or thousands of satellites 102, in various orbits 104. For example, one or more of these satellites 102 may be in non-geosynchronous orbits (NGOs) in which they are in constant motion with respect to the Earth. For example, the orbit 104 is a low earth orbit (LEO). In this illustration, the orbit 104 is depicted with an arc pointed to the right. A first satellite (SAT1) 102(1) is leading (ahead of) a second satellite (SAT2) 102(2) in the orbit 104.

The satellite 102 comprises a communication system 120. For example, the communication system 120 may include one or more modems, digital signal processors, power amplifiers, antennas, processors, memories, storage devices, communications peripherals, interface buses, and so forth.

One or more ground stations 106 are in communication with one or more satellites 102. The ground stations 106 may pass data between the satellites 102, a management system 150, networks such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks. For example, the ground station 106 may connect to a terrestrial fiber optic communication network. The ground station 106 may act as a network ground station, passing user data 112 or other data between the one or more communication networks and the satellites 102. Such data may be processed by the ground station 106 and communicated via the communication system 140. The communication system 140 of a ground station 106 may include components similar to those of the communication system 120 of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data that indicates when communication is to be transferred from the first satellite 102(1) to the second satellite 102(2). Continuing the example, the scheduling system 156 may also specify communication parameters such as frequency, timeslot, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to user data 112 associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The UT 108 passes user data 112 between the constellation of satellites 102 and the user device 110. The user data 112 includes data such as incoming packets 122 that are addressed to a destination device such as the user device 110, or outgoing packets 124 that are sent from the destination device to another device such as a server 134 on a network 144 such as the internet.

The UT 108 may be fixed or in motion. For example, the UT 108 may be used at a residence, or on a vehicle such as a car, boat, aerostat, drone, airplane, and so forth.

The UT 108 includes a communication system 180 to establish communication with one or more satellites 102. The communication system 180 of the UT 108 may include components similar to those of the communication system 120 of a satellite 102 and may perform similar communication functionalities. For example, the communication system 180 includes a satellite network interface that may comprise one or more modems, digital signal processors, power amplifiers, antennas, processors, memories, storage devices, communications peripherals, interface buses, and so forth. In some implementations, the communication system 180 may be operated in a half-duplex communication mode. The communication system 180 may also include a local area network (LAN) network interface to provide communication with a LAN. For example, the LAN network interface may comprise an Ethernet interface, WiFi interface, and so forth.

The communication system 180 includes a latency normalization module 126. The latency normalization module 126 may use one or more normalization parameters 128 during operation. The latency normalization module 126 may comprise one or more computer executable instructions executing on one or more processors. In other implementations, the latency normalization module 126 may comprise a dedicated microcontroller or other device.

The latency normalization module 126 accepts incoming packets 122 from a first communication interface and selectively sends those incoming packets 122 using a second communication interface to a destination device. For example, incoming packets 122 received by a satellite communication interface are processed by the latency normalization module 126 and sent via a local area network interface to a destination device.

The latency of incoming packets 122 received at the UT 108 may vary for many reasons. Changing distances between the satellite and the UT 108 results in changing propagation latencies. Incoming packets 122 may traverse different routes before reaching the UT 108. For example, incoming packets 122 may be routed through an intersatellite link 190 that adds latency. In another example, incoming packets 122 may be routed to a first ground station 106 and then to second ground station 106. Other aspects of operation of the network may introduce latency. For example, half-duplex operation of the UT 108 may add latency to incoming packets 122 while the UT 108 is transmitting, and due to the half-duplex operation is unable to receive those incoming packets 122. This latency may vary due to modulation and coding (modcod) changing throughput that may occur due to changing conditions such as precipitation along the propagation path, ice buildup on the UT 108 antenna, and so forth.

As a result of these and other factors, the latency associated with individual incoming packets 122 may vary substantially. Without normalization of this latency, downstream users of these incoming packets 122 are subjected to substantial changes in latency from packet to packet. For example, a first incoming packet 122 may have a latency of 35 milliseconds (ms) while a second incoming packet 122 may have a latency of 175 ms while a third incoming packet has a latency of 20 ms. Such changes in latency can affect operation of participating network interfaces, network protocols, applications, and so forth. For example, an application may attempt to dynamically determine an expected latency and send a control message such as "packet not received" if a packet is not received as expected. In situations where latency varies widely, this may result in the application sending unnecessary "packet not received" messages when the packet is actually still in transit, unnecessarily consuming network bandwidth. In another example, a voice over internet protocol (VOIP) application may attempt to determine an expected latency and buffer voice data accordingly. Similarly, substantial variations in actual latency may result in poor call quality, such as stutters, pauses, accelerated presentation (speedups), and so forth.

During operation, the latency normalization module 126 moderates when the incoming packets 122 are sent by using a latency normalization algorithm. This selectively delivers incoming packets 122 once a deadline time has arrived (or passed). Incoming packets 122 are stored in a first-in-first-out (FIFO) waiting packet buffer (WPB). Data associated with the incoming packet 122, such as a sequence number and a deadline are determined. For example, the sequence number may be retrieved from a packet header. In another example, the deadline may be determined based on a transmit time and an expected latency. These aspects are discussed in more detail with regard to the following figures.

During processing iterations, incoming packets 122 in the WPB are inspected, and selectively added to storage locations or "slots". Each slot is associated with a respective sequence number in a sequence number series. A window is defined that specifies a number of contiguous slots to which packets may be written to or read from. In some implementations the window may be implemented as a circular buffer. Various markers or other equivalent indicia are used to manage the movement of the window with respect to the slots. The slots within the window are assessed, and those packets having a deadline that has been reached or exceeded are sent. This processing is discussed in more detail with regard to the following figures.

The latency normalization module 126 may also provide other functions, such as addressing out-of-order (OOO) delivery of incoming packets 122, deduplication of incoming packets 122, and so forth. In implementations in which OOO processing is permitted, OOO incoming packets 122 may be accommodated and placed into their appropriate slots before transmission, remedying the OOO condition, or may be transmitted OOO. However, if strict sequence enforcement is enabled, these OOO packets may not be placed in slots and are subsequently discarded. If an incoming packet 122 is deemed to have already been received, this duplicate may be discarded.

The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite 102(2), time of flight correction, or other information at a specified time. The determination of the tracking data 186 may be ongoing. For example, the UT 108 may determine tracking data 186 every 100 ms, every second, every five seconds, or at other intervals.

With regard to FIG. 1, an uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link 190 provides for communication between satellites 102 in the constellation.

The system 100 may include one or more POP systems 146. Each POP system 146 may comprise one or more servers or other computing devices. Separate POP systems 146 may be located at different locations. In one implementation, a POP system 146 may be associated with providing service to a plurality of UTs 108 that are located in a particular geographic region.

The POP systems 146 may manage communication between the system 100 and the network 144. For example, a first POP system 146 may receive upstream data and send that upstream data to the network 144. In another example, the first POP system 146 may receive downstream data and proceed to attempt delivery of the downstream data to the UT 108.

The POP system 146 is in communication with one or more ground stations 106(1), 106(2), . . . , 106(G) and the management system 150. In some implementations one or more functions may be combined. For example, the POP system 146 may perform one or more functions of the management system 150. In another example, the POP system 146 may be included in an integrated ground station 106.

One or more servers 134 may communicate with the POP system 146 via the network(s) 144. The servers 134 may provide various functions, such as content delivery, navigation, data storage and retrieval, and so forth. For example, the servers 134 may store video content that may be requested and streamed to a user device 110.

The satellite 102, the ground station 106, the user terminal 108, the user device 110, the management system 150, the POP system 146, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 144. For example, the transitory machine-readable signal may comprise transmission of software by the Internet.

Figure 2:
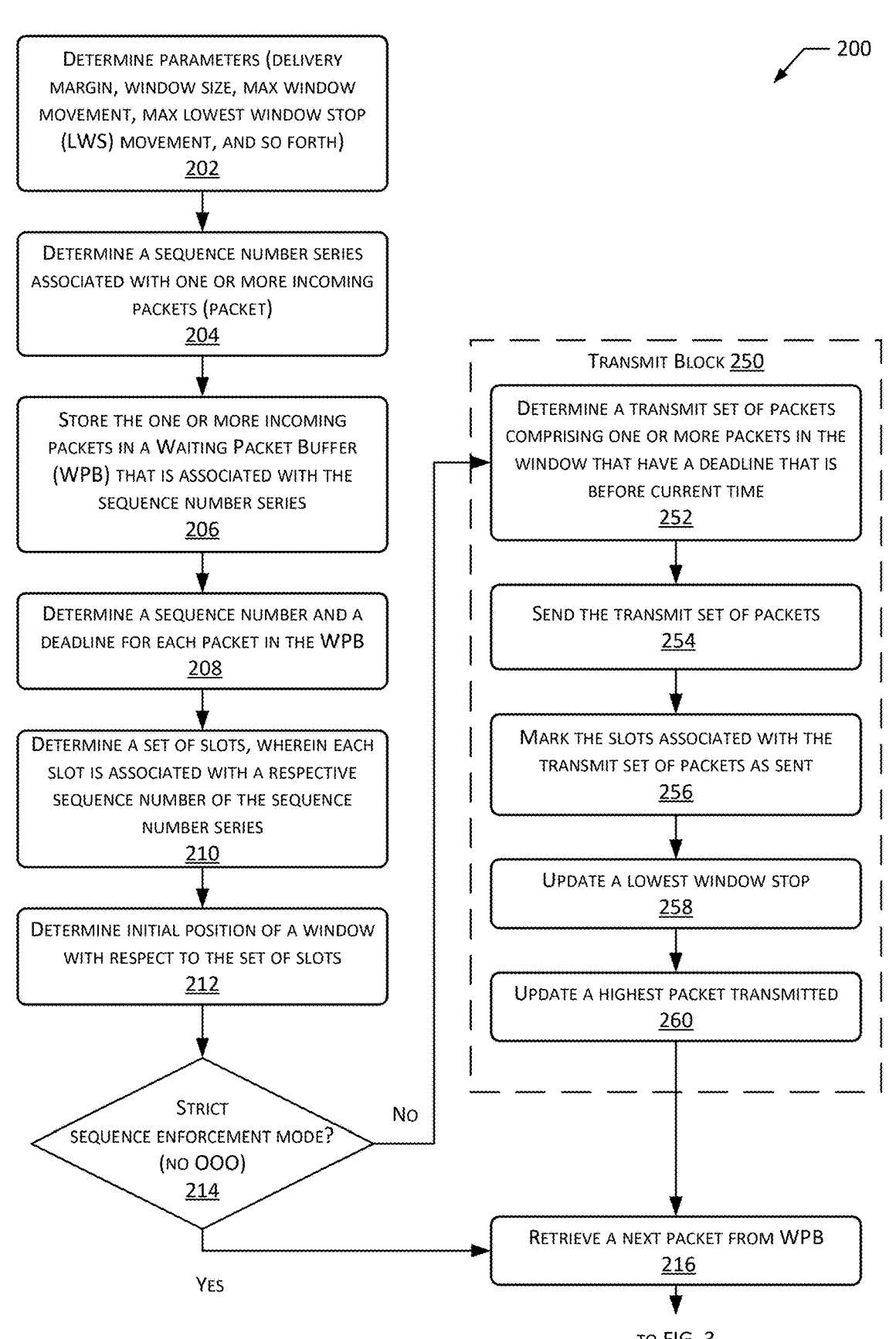
Figure 4:
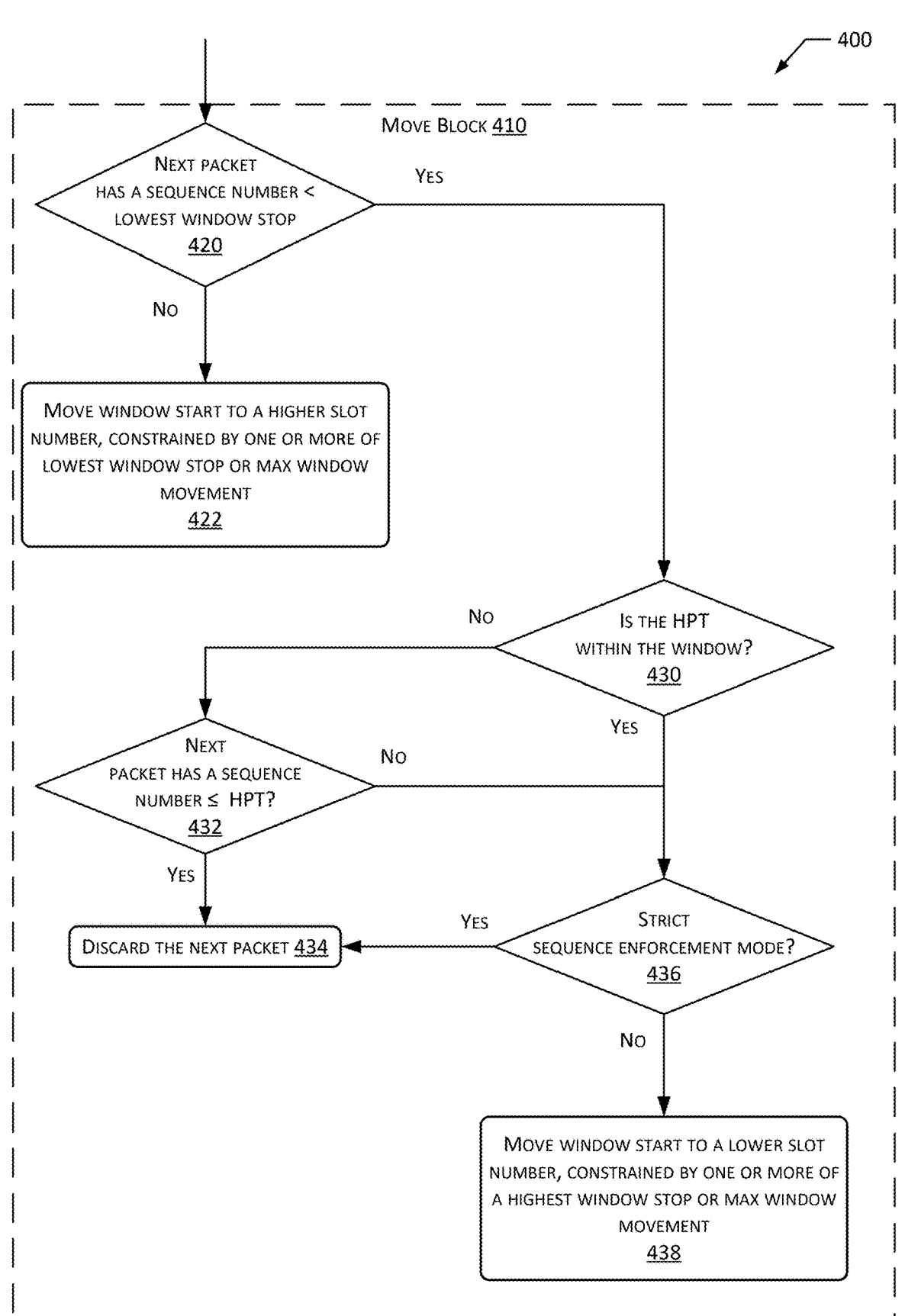

FIGS. 2-4 are flow diagrams of a process of latency normalization, according to some implementations. The process may be implemented, at least in part, as instructions that are executed by one or more processors of a device, such as the user terminal 108.

FIG. 2 shows at 200 operations 202-260.

At 202 one or more normalization parameters 128 are determined. The normalization parameters 128 may include one or more of a delivery margin, window size, maximum (max) window movement, max lowest window stop movement, max highest window stop movement, and so forth. In some implementations, the normalization parameters 128 may include additional parameters.

The normalization parameters 128 may be pre-set, determined before a satellite pass, determined during a satellite pass, or combinations thereof. In some implementations, such as described below, some normalization parameters 128 may be received from, or based on data from, other portions of the network such as the management system 150.

One or more of the normalization parameters 128 may be updated during operation. For example, the delivery margin, window size, and so forth may be adjusted based on changing conditions, user preferences, and so forth. In some implementations different normalization parameters 128 may be used for different types of traffic, transmission control protocol sessions, incoming packets 122 from a specified address, and so forth.

The latency normalization module 126 implements a set of slots for each sequence number series. For example, each cryptographic key may be associated with a different series of monotonically increasing sequence numbers. A slot may comprise a data storage location or may comprise a possible data storage location.

In one implementation, one slot may be allocated for each sequence number in the sequence number series. In some implementations the set of slots implemented may be a subset of the entire set of potential sequence numbers. For example, a sequence number series may include 2,000 monotonically increasing sequence numbers, and the set of slots may only encompass the first half of these sequence numbers.

The delivery margin may be a value indicative of a maximum expected latency of transfer of a packet from a first endpoint to the UT 108. The first endpoint may be a device in the network 144, the POP system 146, ground station 106, and so forth. For example, the delivery margin may comprise the maximum expected latency during a specified time interval such as 10 minutes, visible satellite pass, and so forth. This may be the maximum expected latency from the ground station 106 or the POP system 146 to the UT 108. This may include expected delays due to buffering, processing, transmission, propagation due to changing distances between participating stations in the network such as the ground station 106 and the satellite 102, intersatellite link(s) 190, the satellite 102 and the UT 108, and so forth. The delivery margin may be based on a time division multiplexing interval associated with half-duplex operation of a portion of the network, such as the downlink from the satellite 102 to the UT 108. For example, the delivery margin may include latency due to half-duplex operation on the downlink to the UT 108 during which incoming packets 122 are buffered at the satellite 102 while the UT 108 is transmitting.

The delivery margin may be based on routing used to deliver incoming packets 122 to the UT 108 or changes to routing. A ground station handover may occur, introducing a ground station handover interval while incoming packets 122 are directed from a first ground station 106 to a second ground station 106.

The delivery margin may be based on an intersatellite link latency that is associated with transmission of incoming packets 122 between two or more satellites 102. For example, the intersatellite link latency may be based on the number of intersatellite links 190 and latencies due to distance, processing and retransmission, and so forth.

A satellite handover may occur, introducing a satellite handover interval while a route change from a first satellite 102 to a second satellite 102 results in a change in the route traversed by incoming packets 122. The delivery margin may be based on the satellite handover interval.

The delivery margin may be determined by a device external to the latency normalization module 126. For example, the management system 150 may send the delivery margin or other data used to determine the delivery margin to the UT 108.

The delivery margin may be determined based on previously stored data or information in the incoming packets 122. For example, the communication system 180 may have previously stored log data indicative of maximum latencies experienced during previous passes. This log data may be used to determine the delivery margin. In another example, the UT 108 may use data from the tracking system 182 to determine maximum distance during a pass, and calculate a maximum latency expected during communication with a particular satellite 102.

The window size is indicative of a number of sequential or contiguous slots included in a window. The window size 556 is illustrated with regard to FIG. 5.

During operation the window may be moved, with respect to the slots. One or more constraints may be used to limit window movement during an iteration of processing. A max window movement may specify a maximum number of slots that the window may be moved during a processing iteration. In some implementations the max window movement may be set to limit processing done during a processing iteration. In some implementations the max window movement may be specified with regard to a particular iteration or pass. In other implementations the max window movement may be specified with regard to a plurality of passes.

These constraints may be implemented at least in part using various markers such as a lowest window stop (LWS), highest window stop (HWS), and so forth. In some implementations limits may be placed as to how far one or more of these stops may be moved during an iteration. For example, a max lowest window stop may specify a maximum number of slots that the LWS may be moved in a processing iteration. In another example a max highest window stop may specify a maximum number of slots that the HWS may be moved in a processing iteration. Use of these stops to constrain window movement are discussed in more detail in the following description.

At 204 a sequence number series associated with one or more incoming packets 122 is determined. For example, a packet header of one or more of the incoming packets 122 may be inspected to determine a cryptographic key index indicative of a particular cryptographic key to be used, a sequence number series value, or a sequence number. For example, a cryptographic key rotation schedule may involve changing the cryptographic keys at specified intervals or events, and each cryptographic key may be associated with a particular set of sequence numbers.

At 206 the one or more incoming packets 122 are stored in a waiting packet buffer (WPB) 520 (see FIG. 5) that is associated with the sequence number series. The WPB 520 may utilize first-in-first-out (FIFO) queuing. Each WPB 520 is associated with a respective sequence number series. For example, at a given time there may be four possible sequence number series corresponding to old (previous), present (current), future (next), and unknown that are managed by the latency normalization module 126. For ease of discussion, and not as a limitation, the following discussion and examples describe operations associated with a single WPB 520 and sequence number series associated with a set of sequence numbers. It is understood that the latency normalization module 126 during operation may support operations associated with a plurality of sequence number series.

At 208 a sequence number and a deadline are determined for each packet in the WPB 520. In one implementation, the sequence number may be read from a packet header. For example, a packet header of the incoming packet 122 may include a sequence number field. In some implementations the sequence number may be determined from a packet header of an encapsulating packet. For example, the incoming packet 122 may be encrypted and encapsulated. The packet header from this encapsulating packet may be used to determine the sequence number.

The deadline is based on a transmission time of the incoming packet 122 and delivery margin. The transmission time may be determined based on data included in the incoming packet 122, or an encapsulating packet. For example, the incoming packet 122 may include a timestamp field that is indicative of what clock time or index time that the incoming packet 122 was transmitted or enqueued for transmit at a first endpoint. In some implementations the first endpoint that sets the transmission time may a POP system 146, ground station 106, and so forth.

In some implementations, the transmission time may be expressed in a truncated form to minimize a number of bits transmitted. The latency normalization module 126 may attempt to determine the transmission time by disambiguating the truncated form of the transmission. A rolling time window may be used, with that time window divided into the number of bits available to represent transmission time. For example, if 8 bits are available and each rolling time window is 100 ms long, transmission times may be resolved to $\frac{1}{256}^{th}$ of 100 ms, or about 0.39 ms. In another example, if 7 bits are available and each rolling time windows is 100 ms long, transmission times may be resolved to $\frac{1}{128}$th of 100 ms, or about 0.78 ms. In some implementations, the transmission time may be represented as an 8 bit value comprising the lowest 8 bits of the number of milliseconds elapsed since an epoch of a specified time reference, such as that provided by the Global Positioning System (GPS).

In some implementations the deadline may be calculated as a sum of the transmission time and delivery margin that is indicative of a peak expected latency.

In some implementations the sequence number and the deadline may be stored with the incoming packet 122 in the WPB 520.

At 210 a set of slots are determined. Each slot is associated with a respective sequence number of the sequence number series. A slot may comprise a memory location, or a representation within a table or other data structure.

At 212 an initial position of a window 550 with respect to the set of slots is determined. For example, during initial startup the window 550 may have a window start 552 that begins at a first slot 9000.

In some implementations, a determination may be made at 214 as to whether a strict sequence enforcement mode is in use. During strict sequence enforcement, re-ordering of OOO packets is not permitted. If yes, the process may proceed to 216. If no, the process may proceed to the transmit block 250.

The transmit block 250 may comprise one or more of the operations 252-260.

At 252 a transmit set of packets is determined comprising one or more packets in the window 550 that have a deadline 508 that is before a current time. For example, the current time may be provided by a clock at the UT 108. The clock at the UT 108 may be disciplined by an external time reference, such as a GPS receiver.

At 254 the transmit set of packets are sent. For example, the transmit set of packets are sent using a local area network interface to a local area network. The destination device(s) that the incoming packet(s) 122 are addressed to may then receive the incoming packet(s) 122.

At 256 the slots associated with the transmit set of packets are marked as "sent". For example, a single bit field associated with each slot may be set to a value that indicates a transmitted packet 516.

At 258 a lowest window stop (LWS) is updated. For example, a value may be written that indicates the slot that the LWS has been moved to, as described below.

At 260 a highest packet transmitted (HPT) is updated. For example, a value may be written or a marker may be moved to indicate the slot associated with the incoming packet 122 that was transmitted that has the greatest sequence number or greatest slot number. The HPT marker or other data may be associated with a slot that is not within the window 550. For example, the HPT marker may be associated with any slot, regardless of current placement of the window 550.

At 216 a next packet is retrieved from the WPB 520. For example, the oldest incoming packet 122 is retrieved from the WPB 520 due to the FIFO queuing.

FIG. 3 shows at 300 operations 302-356.

In some implementations, at 302 a determination may be made as to whether the next packet has a sequence number in the set of slots. If no, the process proceeds to 322. At 322 the next packet is moved to the WPB 520 associated with the sequence number series of the next packet. The process may then proceed to 312. In some implementations the determination at 302 may be omitted.

In some implementations, at 304 a determination may be made as to whether a strict sequence enforcement mode is in use. During strict sequence enforcement, re-ordering of OOO packets is not permitted. If yes, the process proceeds to 334. At 334 the HPT in the set of slots is determined and the process proceeds to 336. At 336 a determination may be made as to whether the next packet has a sequence number less than or equal to the HPT. If no, the process proceeds to 306. If yes, the process proceeds to 342. At 342 the next packet is discarded. The process may then return to 312. In some implementations the determination at 304 may be omitted.

At 306 a determination may be made as to whether there is already a transmitted packet 516 with the same sequence number as the next packet. If yes, the process proceeds to 342. If no, the process proceeds to 308.

At 308 a determination is made as to whether the sequence number of the next packet is within the window 550. If no, the process proceeds to 352. If yes, the process proceeds to 310. The latency normalization module 126 may be constrained to operating only on packets in slots within the window 550, only inserting incoming packets 122 into slots that are within a window 550 or sending packets that are within slots within the window 550.

At 352 the window 550 may be moved. This is discussed in more detail with regard to the move block 410 in FIG. 4. The movement of the window 550 is subject to one or more constraints. One of these constraints is that the window 550 may not be moved such that an incoming packet 122 that is waiting to be transmitted cannot be excluded from the window 550. If movement is not possible, the process may proceed to 356.

Once the window 550 has moved relative to the set of slots, at 354 a determination is made as to whether the sequence number of the next packet is within the (now moved) window 550. If no, the process proceeds to 356. If yes, the process proceeds to 310.

At 356 the next packet may be retained in the WPB 520 and the process may proceed to 312.

At 310 the next packet is inserted at a slot associated with its sequence number. In some implementations one or more of a lowest window stop (LWS) 512 or a highest window stop (HWS) 514 may be updated after the next packet is inserted.

At 312 a determination may be made as to whether a loop limit has been reached. For example, the loop limit may specify a maximum number of processing iterations of at least a portion of the process before proceeding on. In another example, the loop limit may be based on the max window movement, such that when the max window movement is reached, the loop stops. If no, the process may return to 216. If yes, the process may proceed to the transmit block 250. In some implementations, other operations or waits may be performed before proceeding.

The move block 410 shown in FIG. 4 may determine which direction (relative to the slots) to move the window 550 and how far to move the window 550.

FIG. 4 shows at 400 the move block 410 including operations 420-440. The move block 410 may be used as described at 352.

At 420 a determination is made as to whether the next packet has a sequence number less than the lowest window stop 512. If no, the process proceeds to 422. If yes, the process proceeds to 430. In an alternative implementation (not shown), the window 550 may not be permitted to move backward, relative to the slots. In this implementation, if yes at 420, the process may proceed to 434 and the next packet is discarded.

At 422 the window 550 is moved forward relative to the slots such that the window start 552 is moved to a higher slot number. The movement of the window start 552 may be constrained by one or more of the LWS 512 or the max window movement. For example, the window 550 may be prevented from moving such that the LWS 512 is excluded from the window 550. In another example, the window 550 may be prevented from moving more than the number of slots specified by the max window movement. The process may continue, such as to 354.

At 430 a determination is made as to whether the HPT 510 is within the window 550. If no, the process proceeds to 432. If yes, the process proceeds to 436.

At 432 a determination is made as to whether the next packet has a sequence number less than or equal to the HPT 510. If yes, the process proceeds to 434. If no, the process proceeds to 436.

At 434 the next packet is discarded. The process may proceed to 312.

At 436 a determination is made as to whether the strict sequence enforcement mode is in use. As mentioned above, during strict sequence enforcement, re-ordering of 000 packets is not permitted. If re-ordering is not permitted, the window 550 may be constrained to only moving forward, relative to the slots, and not backward. If yes, the process proceeds to 434. If no, the process proceeds to 438.

At 438 the window 550 is moved backward relative to the slots, such that the window start 552 is moved to a lower slot number. The movement of the window start 552 may be constrained by one or more of the HWS 514 or the max window movement. For example, the window 550 may be prevented from moving such that the HWS 514 is excluded from the window 550. In another example, the window 550 may be prevented from moving more than the number of slots specified by the max window movement.

In other implementations, other variations of the process described may be used. For example, operation 430 may be omitted and the process may proceed from a yes at 420 to 432 and then if no at 432 then to 436. In another example, operation 430 may be omitted and the process may proceed from yes at 420 to 436.

FIGS. 5-10 illustrate the slots and the window 550 during various scenarios of operation of the latency normalization module 126, according to some implementations. In one implementation the slots may comprise memory locations. In other implementations the slots within the window 550 may comprise memory locations operated as a circular buffer.

A key 502 depicts the various elements depicted in FIGS. 5-10. Shown in the key 502 are packets 504, sequence numbers 506, deadline (time) 508, highest packet transmitted 510, lowest window stop 512 (also known as a "lowest unsent packet in table"), a highest window stop 514 (also known as a "highest unsent packet in table"), and transmitted packet 516. Once moved, the process may proceed to 354.

The LWS 512 and the HWS 514 constrain movement of the window 550, preventing the window 550 from moving such that an unsent packet 504 is omitted from, or "falls outside" the window 550. For example, the LWS 512 constrains movement of the window start 552 forward with respect to the slots, while the HWS 514 constrains movement of the window start 552 backward with respect to the slots. In some implementations, such as where only forward movement of the window 550 is permitted, the HWS 514 may be omitted.

For ease of illustration, and not as a limitation, a set of slots 9000, 9001, 9002, . . . , 9015 are depicted. A slot may comprise a storage location in memory. For example, a slot may comprise a storage location within a table data structure.

The sequence numbers 506 may comprise sequence numbers that are included in a header of the incoming packet 122. In some implementations the sequence numbers 506 may be associated with a particular cryptographic key. For example, a specific cryptographic key may be associated with a specified set of sequence numbers 506.

The deadline 508 associated with the packet 504 indicates a time on or after which the packet 504 is to be sent to a destination device.

The highest packet transmitted 510 may comprise a marker, pointer, value, and so forth that is indicative of a slot that is associated with the transmitted packet 516 with the greatest sequence number 506 in the set of slots. The highest packet transmitted 510 is not limited to being within the window 550.

A waiting packet buffer (WPB) 520 is a first-in-first-out (FIFO) buffer. Incoming packets 122 are stored in the WPB 520. For example, a packet 504 associated with a sequence number 506 and a deadline 508 is shown stored in the WPB 520.

A window 550 is depicted comprising a plurality of adjacent slots. A window 550 begins at a window start 552 and ends at a window end 554. The window 550 has a window size 556 that comprises the slots from the window start 552 to the window end 554, inclusive. During operation of the latency normalization module 126 the window 550 may operate with a fixed window size 556. For example, in this illustration the window 550 has a window size 556 of 11 slots.

Figure 5:
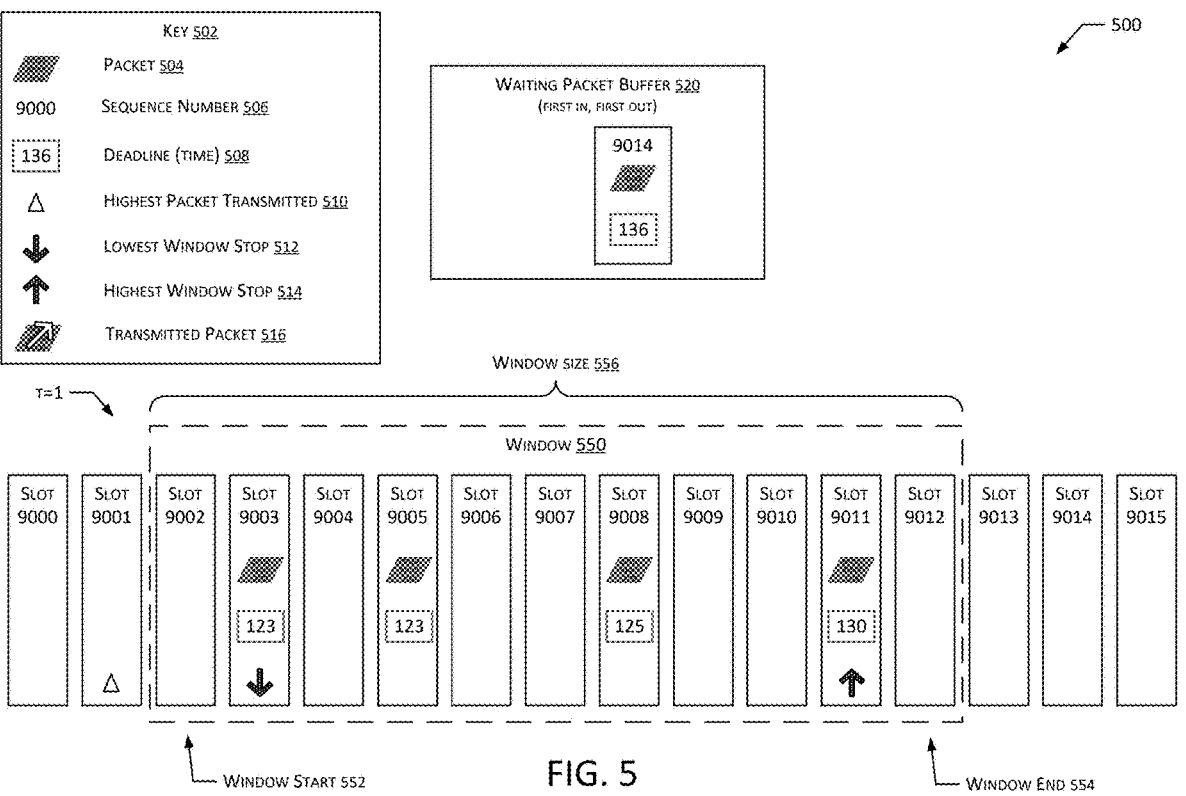
FIGS. 5, 6, 7, 8, 9, and 10 illustrate the slots and the window during various scenarios, according to some implementations.

FIG. 5 shows at 500 a first set of slots and a waiting packet buffer (WPB) 520 depicted at time t=1. Stored in the WPB 520 at this time is a packet 504 having a sequence number 506 of "9014" and having an associated deadline value of "136".

In implementations in which the window 550 is implemented as a circular buffer, and the window size 556 is less than a total size of the first set of slots, the circular buffer can only store packets for a limited subset of the possible sequence numbers 506 in the sequence number series. Slots within the window 550 may be used to store the packet 504 that is waiting to be sent, the transmitted packet 516 marker, and in some implementations a marker indicating that no packet number having that sequence number has been stored or transmitted (e.g. "not seen").

Incoming packets 122 that cannot be immediately stored within the window 550 may be retained in the WPB 520. For example, at t=1 (not shown) packets 504 with sequence numbers of 9003, 9005, 9008, and 9011 were received and stored in the window 550. For example, a packet 504 with sequence number 9003 is stored in slot 9003, a packet 504 with sequence number 9005 is stored in slot 9005, and so on. Each packet 504 is associated with a deadline 508. For example, the packet 504 stored in slot 9003 is associated with a deadline of "123", the packet 504 stored in slot 9008 is associated with a deadline of "125", and so forth.

Incoming packet 504 with the sequence number of 9014 is associated with a slot outside of the window 550, and so is retained in the WPB 520.

Also depicted is a lowest window stop (LWS) 512 at slot 9003. In some implementations the LWS 512 may also be known as the "lowest unsent packet in table". The LWS 512 marker may be set to the slot within the window 550 that has the lowest sequence number and contains an (unsent) packet 504.

Also depicted is a highest window stop (HWS) 514 at slot 9011. In some implementations the HWS 514 may also be known as the "highest unsent packet in table". The HWS 514 marker may be set to the slot within the window 550 that has the highest sequence number and contains an (unsent) packet 504.

A highest packet transmitted (HPT) 510 is also shown, at slot 9001. The HPT 510 indicates the highest sequence number in the table that has been previously sent, such as on a local area network interface. The HPT 510 is not limited to being within the window 550. For example, the HPT 510 may be maintained as a separate stored value.

Figure 6:
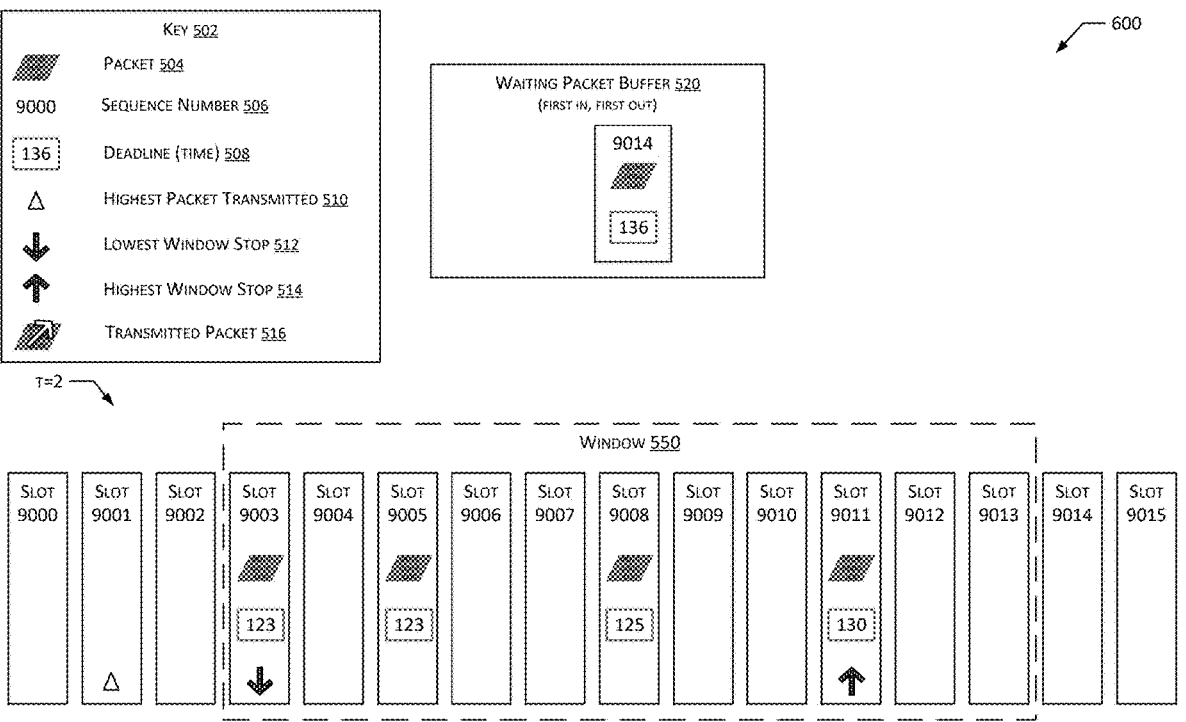

FIG. 6 shows at 600 the first set of slots and the WPB 520 at time t=2. Stored in the WPB 520 at this time is the packet 504 having a sequence number 506 of "9014" and having an associated deadline value of "136".

Because the sequence number 506 of the next packet 504 in the WPB 520 is "9014", the window 550 needs to be moved forward (relative to the slots). As a result, the window 550 is advanced forward such that the window start 552 is now at slot 9003. Movement of the window 550 may be constrained to prevent the window 550 from moving to exclude an (unsent) packet 504. In this illustration, because slot 9003 is occupied by a packet 504, the window 550 may only be advanced forward until the window start 552 is equal to slot 9003.

Figure 7:
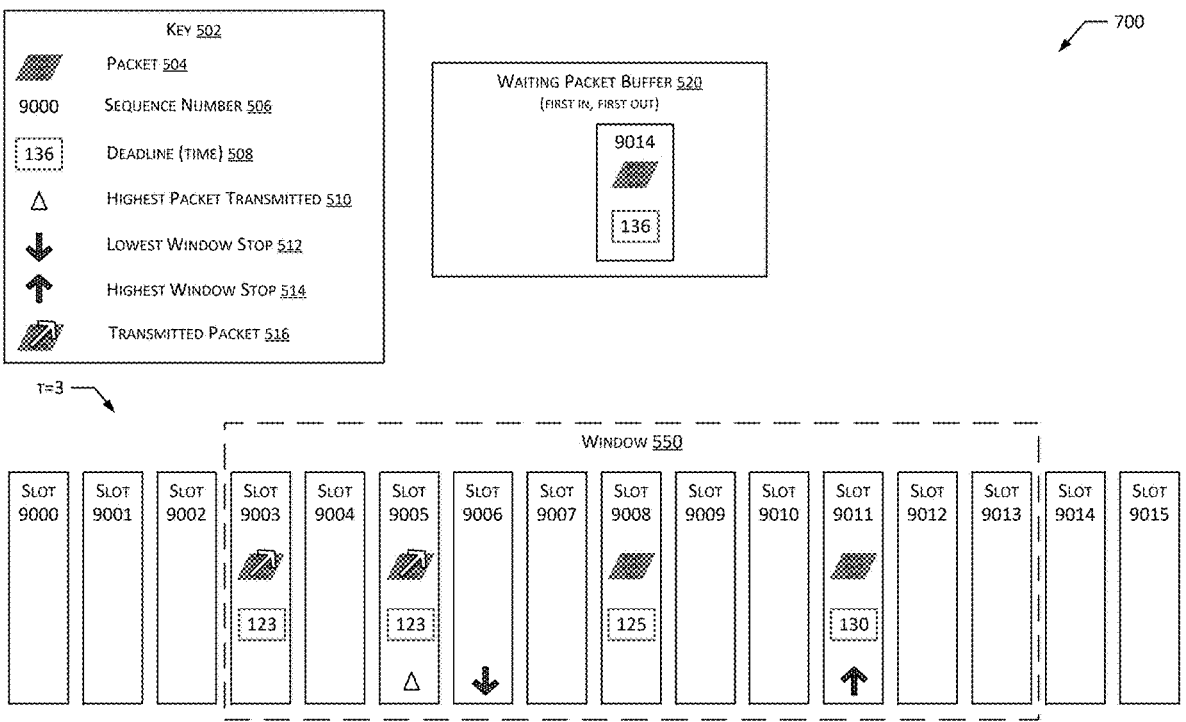

FIG. 7 shows at 700 the first set of slots and the WPB 520 at time t=3. Stored in the WPB 520 at this time is the packet 504 having a sequence number 506 of "9014" and having an associated deadline value of "136".

Packets 504 exit the window 550 (or circular buffer) during processing iterations. During these iterations, the LWS 512 is used to walk through the circular buffer. As the LWS 512 is advanced, as the process encounters packets 504 in a slot, the deadline 508 is checked against the current time. If the deadline time has not yet been met, the process stops without sending the packet 504. If the deadline 508 has passed, the packet 504 is transmitted and the LWS 512 is advanced.

The window 550 has been processed to determine which packets 504 have deadlines that are earlier than the current time and sends those packets. (See transmit block 250, FIG. 2.) In this illustration, packets 504 in slots 9003 and 9005 have been sent. The packet 504 associated with slot 9004 still has not been received, and the max window movement limit has not been reached, so the processing continues to slot 9005.

The HPT 510 has been updated to indicate slot 9005. The LWS 512 is advanced to the next slot after the HPT 510, in this illustration slot 9006.

Figure 8:
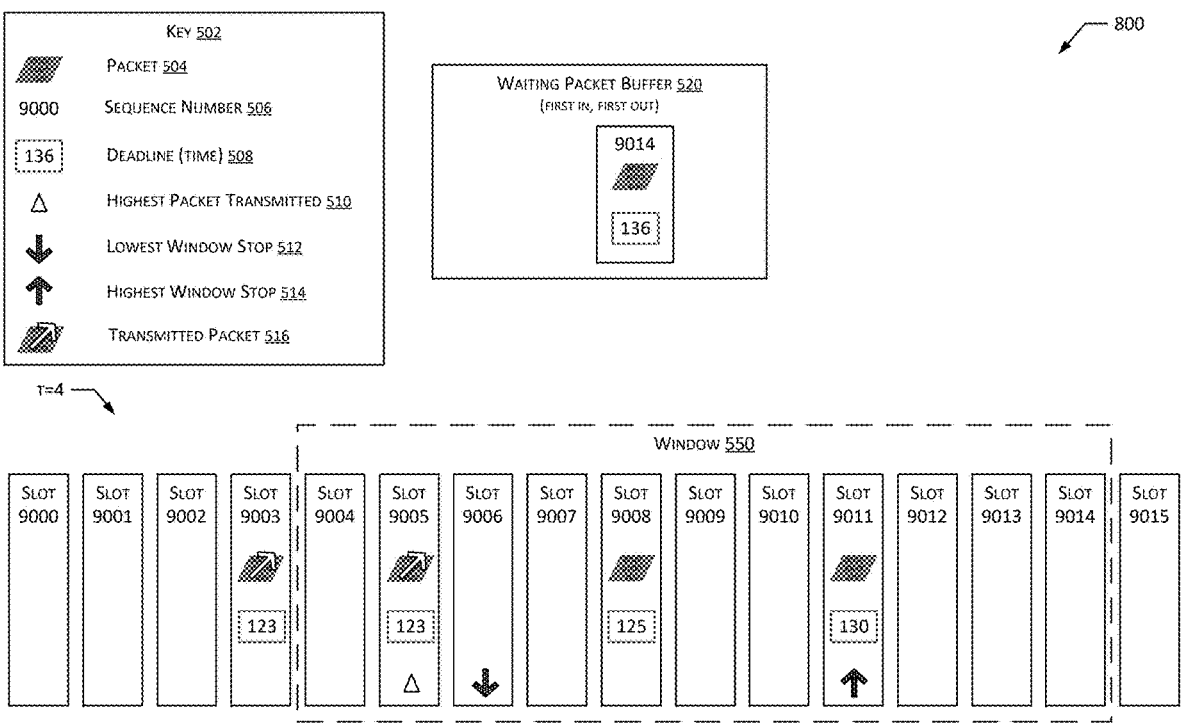

FIG. 8 shows at 800 the first set of slots and the WPB 520 at time t=4. Stored in the WPB 520 at this time is the packet 504 having a sequence number 506 of "9014" and having an associated deadline value of "136".

Because the packet 504 in the WPB 520 has a sequence number of 9014, outside the window 550, the process attempts to advance the window 550 until slot 9014 (which can accept the packet 504 with the sequence number 9014) is within the window 550.

In this illustration, slot 9003 is associated with a transmitted packet 516, and so the window 550 is able to advance to a window start 552 of slot 9004. With that movement and the fixed window size 556, slot 9014 is now within the window 550.

The packet 504 with sequence number 9014 may now be moved from the WPB 520, into slot 9014.

Figure 9:
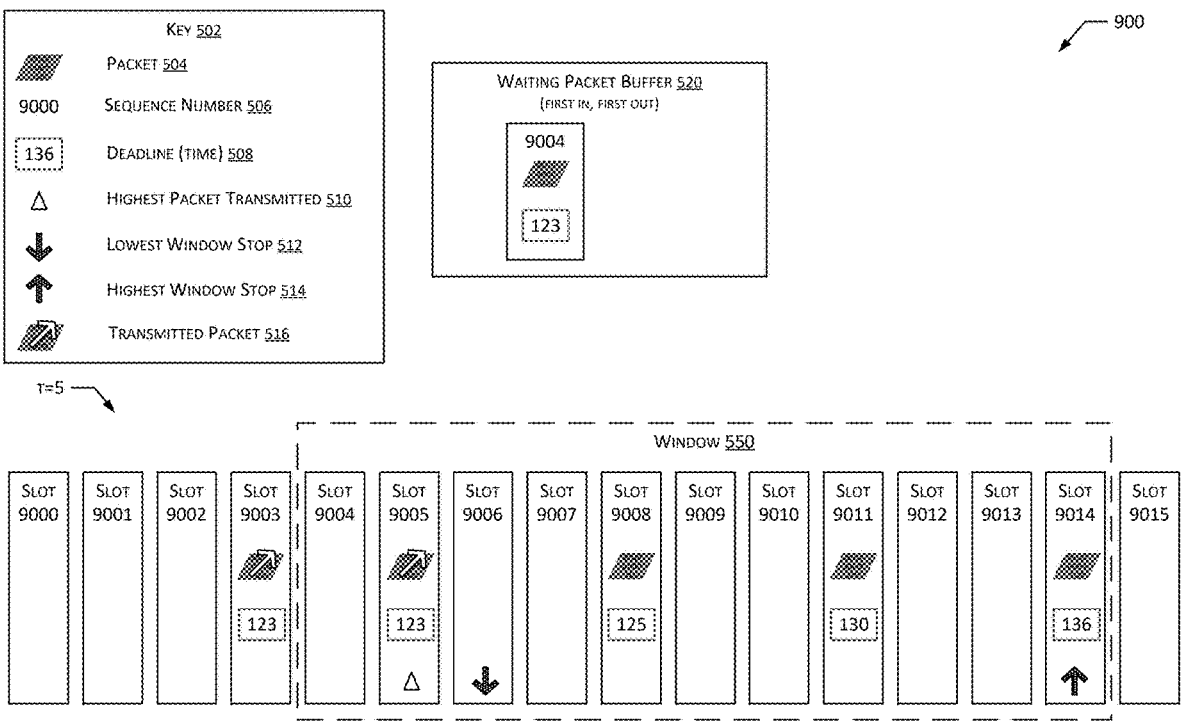

FIG. 9 shows at 900 the first set of slots and the WPB 520 at time t=5. Now stored in the WPB 520 is the packet 504 having a sequence number 506 of "9004" and having an associated deadline value of "123". This packet is an OOO packet, having been received after packets 504 with greater sequence numbers have already been transmitted.

As described with regard to FIGS. 2-4, a strict sequence enforcement mode may be enabled that discards OOO packets. With regard to FIGS. 9 and 10, the strict enforcement mode is "off", and OOO packets are processed.

Given the presence in the WPB 5220 of the packet 504 with the sequence number 9004 that is less than the HPT 510 at slot "9005", the window 550 will need to be moved back with respect to the slots.

Figure 10:
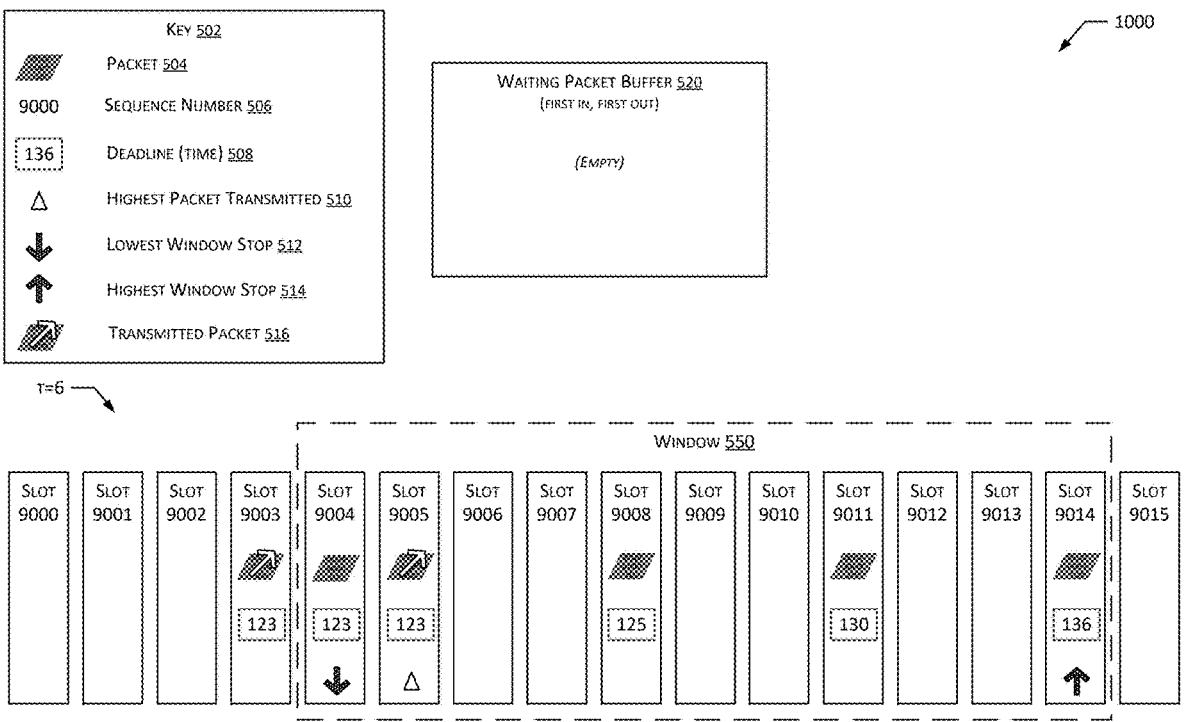

FIG. 10 shows at 1000 the first set of slots and the WPB 520 at time t=6. The windows 550 has been moved back, and the window start 552 is now slot 9004. The packet 504 having a sequence number 506 of "9004" and having an associated deadline value of "123" is stored in slot 9004. The LWS 512 has been moved backward to slot 9004. During the next assessment for transmission, the packet 504 in slot 9004 will be sent immediately as its deadline 508 has already passed.

The circuitry, processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A user terminal (UT) device comprising:
a satellite network interface; and
a first set of one or more processors executing instructions to:
    determine parameters comprising:
        a delivery margin indicative of a maximum expected latency of transfer of a packet from a first device to the UT device, and
        a window size indicative of a number of sequential slots included in a window;
    receive a first incoming packet using the satellite network interface;
    determine, based on a first header of the first incoming packet, a first sequence number;
    determine, based on the first sequence number, a first sequence number series associated with the first incoming packet;
    determine, based on the first header of the first incoming packet, a first transmission time;
    determine, based on the first transmission time and the delivery margin, a first deadline that is associated with the first incoming packet;
    determine a first set of slots, wherein each slot is associated with a respective sequence number of the first sequence number series and includes the first sequence number;
    determine the window with respect to the first set of slots, wherein the window has the window size;
    store the first incoming packet in a first buffer, wherein the first incoming packet is associated with the first sequence number and the first deadline;
    determine the first sequence number is within the window; and
    store the first incoming packet at a slot within the window that is associated with the first sequence number.

2. The device of claim 1, the first set of one or more processors executing instructions to:
    determine the delivery margin based on one or more of:
        estimated peak latency between a first endpoint and the UT device during a specified time interval,
        maximum signal propagation delay associated with transmission of packets to the UT device via a first ground station and one or more satellites,
        a time division multiplexing time interval associated with a half-duplex downlink from a satellite to the UT device,
        intersatellite link latency associated with transmission of packets between two or more satellites,
        a ground station handover interval associated with a route change from a first ground station to a second ground station, or a satellite handover interval associated with a route change from a first satellite to a second satellite.

3. The device of claim 1, further comprising:
a local area network interface; and
the first set of one or more processors executing instructions to:
    determine a current time;
    determine a transmit set of packets comprising one or more incoming packets in the window that have a deadline before the current time;
    send the transmit set of packets using the local area network interface; and
    mark one or more of the slots in the first set of slots that are associated with the transmit set of packets as sent.

4. The device of claim 1, the first set of one or more processors executing instructions to:
    determine a maximum window movement indicative of a maximum permitted movement, with respect to a set of slots, of the window;
    receive a second incoming packet using the satellite network interface;
    determine, based on a second header of the second incoming packet, a second sequence number;
    determine the second sequence number is not within the window;
    move, based on the second sequence number and subject to one or more constraints including the maximum window movement, the window from a first position to a second position with respect to the first set of slots;
    determine the second sequence number is within the window that is associated with the second position; and
    store the second incoming packet at a slot within the window that is associated with the second sequence number.

5. The device of claim 4, the one or more constraints further including that the window cannot move to exclude a slot containing a packet that has not yet been sent to a destination device.

6. The device of claim 1, the first set of one or more processors executing instructions to:
    receive a second incoming packet using the satellite network interface;
    determine, based on a second header of the second incoming packet, a second sequence number;
    determine the second sequence number is greater than a highest sequence number associated with a first window end of the window while the window is at a first position;
    move the window from the first position to a second position with respect to the first set of slots, wherein the second position has a second window end that is greater than the first window end;
    determine the second sequence number is within the window that is associated with the second position; and
    store the second incoming packet at the slot within the window that is associated with the second sequence number.

7. The device of claim 1, the first set of one or more processors executing instructions to:
    receive a second incoming packet using the satellite network interface;
    determine, based on a second header of the second incoming packet, a second sequence number;
    determine that the second sequence number is greater than or equal to a lowest window stop;

determine that a highest packet transmitted sequence number is not within the window;

determine that the second sequence number is less than or equal to the highest packet transmitted sequence number; and discard the second incoming packet.

8. The device of claim 1, the first set of one or more processors executing instructions to:

receive a second incoming packet using the satellite network interface;

determine, based on a second header of the second incoming packet, a second sequence number;

determine that the second sequence number is greater than or equal to a lowest window stop;

determine that a highest packet transmitted sequence number is within the window;

determine the second incoming packet is associated with a first mode; and discard the second incoming packet.

9. The device of claim 1, the first set of one or more processors executing instructions to:

receive a second incoming packet using the satellite network interface;

determine, based on a second header of the second incoming packet, a second sequence number;

determine, based on the second sequence number, a second sequence number series associated with the second incoming packet;

determine a second window that is associated with the second sequence number series; and store the second incoming packet at a slot within the second window that is associated with the second sequence number.

10. A computer-implemented method comprising:

determining parameters comprising:

a delivery margin indicative of a maximum expected latency of transfer of a packet from a first device to a user terminal (UT) device, and a window size indicative of a number of sequential slots included in a window;

receiving a first incoming packet;

determining, based on a first header of the first incoming packet, a first sequence number;

determining, based on the first sequence number, a first sequence number series associated with the first incoming packet;

determining, based on the first header of the first incoming packet, a first transmission time;

determining, based on the first transmission time and the delivery margin, a first deadline that is associated with the first incoming packet;

determining a first set of slots, wherein each slot is associated with a respective sequence number of the first sequence number series and includes the first sequence number;

determining the window with respect to the first set of slots, wherein the window has the window size;

storing the first incoming packet in a first buffer, wherein the first incoming packet is associated the first sequence number and the first deadline;

determining the first sequence number is within the window; and storing the first incoming packet at a slot within the window that is associated with the first sequence number.

11. The method of claim 10, further comprising:

determining the delivery margin based on one or more of:

estimated peak latency between a first endpoint and the UT device during a specified time interval, maximum signal propagation delay associated with transmission of packets to the UT device via a first ground station and one or more satellites, a time division multiplexing time interval associated with a half-duplex downlink from a satellite to the UT device, intersatellite link latency associated with transmission of packets between two or more satellites, a ground station handover interval associated with a route change from a first ground station to a second ground station, or a satellite handover interval associated with a route change from a first satellite to a second satellite.

12. The method of claim 10, further comprising:

determining a current time;

determining a transmit set of packets comprising one or more incoming packets in the window that have a deadline before the current time;

sending the transmit set of packets; and marking one or more of the slots in the first set of slots that are associated with the transmit set of packets as sent.

13. The method of claim 10, further comprising:

determining a maximum window movement indicative of a maximum permitted movement, with respect to a set of slots, of the window;

receiving a second incoming packet;

determining, based on a second header of the second incoming packet, a second sequence number;

determining the second sequence number is not within the window;

moving, based on the second sequence number and subject to one or more constraints including the maximum window movement, the window from a first position to a second position with respect to the first set of slots;

determining the second sequence number is within the window that is associated with the second position; and storing the second incoming packet at a slot within the window that is associated with the second sequence number.

14. The method of claim 13, the one or more constraints further including that the window cannot move to exclude a slot containing a packet that has not yet been sent to a destination device.

15. The method of claim 10, further comprising:

receiving a second incoming packet;

determining, based on a second header of the second incoming packet, a second sequence number;

determining the second sequence number is greater than a highest sequence number associated with a first window end of the window while the window is at a first position;

moving the window from the first position to a second position with respect to the first set of slots, wherein the second position has a second window end that is greater than the first window end;

determining the second sequence number is within the window that is associated with the second position; and storing the second incoming packet at the slot within the window that is associated with the second sequence number.

16. The method of claim 10, further comprising:

receiving a second incoming packet;

determining, based on a second header of the second incoming packet, a second sequence number;

determining that the second sequence number is greater than or equal to a lowest window stop;

determining that a highest packet transmitted sequence number is not within the window;

determining that the second sequence number is less than or equal to the highest packet transmitted sequence number; and discarding the second incoming packet.

17. The method of claim 10, further comprising:

receiving a second incoming packet;

determining, based on a second header of the second incoming packet, a second sequence number;

determining the second incoming packet is associated with a first mode;

determining the second sequence number is less than or equal to a highest packet transmitted (HPT) sequence number; and discarding the second incoming packet.

18. The method of claim 10, further comprising:

receiving a second incoming packet;

determining, based on a second header of the second incoming packet, a second sequence number;

determining, based on the second sequence number, a second sequence number series associated with the second incoming packet;

determining a second window that is associated with the second sequence number series; and storing the second incoming packet at a slot within the second window that is associated with the second sequence number.

19. A system comprising:

a first set of one or more processors executing instructions to:

receive a first incoming packet;

determine, based on a first header of the first incoming packet, a first sequence number;

determine, based on the first sequence number, a first sequence number series associated with the first incoming packet;

determine a delivery margin indicative of a latency to transfer a packet;

determine, based on the first header of the first incoming packet, a first transmission time;

determine, based on the first transmission time and the delivery margin, a first deadline that is associated with the first incoming packet;

determine a first set of slots, wherein each slot is associated with a respective sequence number of the first sequence number series and includes the first sequence number;

determine a window with respect to the first set of slots, wherein the window has a window size;

store the first incoming packet in a first buffer, wherein the first incoming packet is associated the first sequence number and the first deadline;

determine the first sequence number is within the window; and store the first incoming packet at a slot within the window that is associated with the first sequence number.

20. The system of claim 19, the first set of one or more processors executing instructions to:

determine a maximum window movement indicative of a maximum permitted movement, with respect to a set of slots, of the window;

receive a second incoming packet;

determine, based on a second header of the second incoming packet, a second sequence number;

determine the second sequence number is not within the window;

move, based on the second sequence number, the window from a first position to a second position with respect to the first set of slots, wherein the window cannot move:

to exclude a slot containing a packet that has not yet been sent, or more than the maximum window movement;

determine the second sequence number is within the window that is associated with the second position; and store the second incoming packet at a slot within the window that is associated with the second sequence number.

\* \* \* \* \*